July 15, 1952  H. E. BRELSFORD  2,603,090
MULTIPORT WATER LEVEL INDICATOR
Filed Aug. 27, 1948
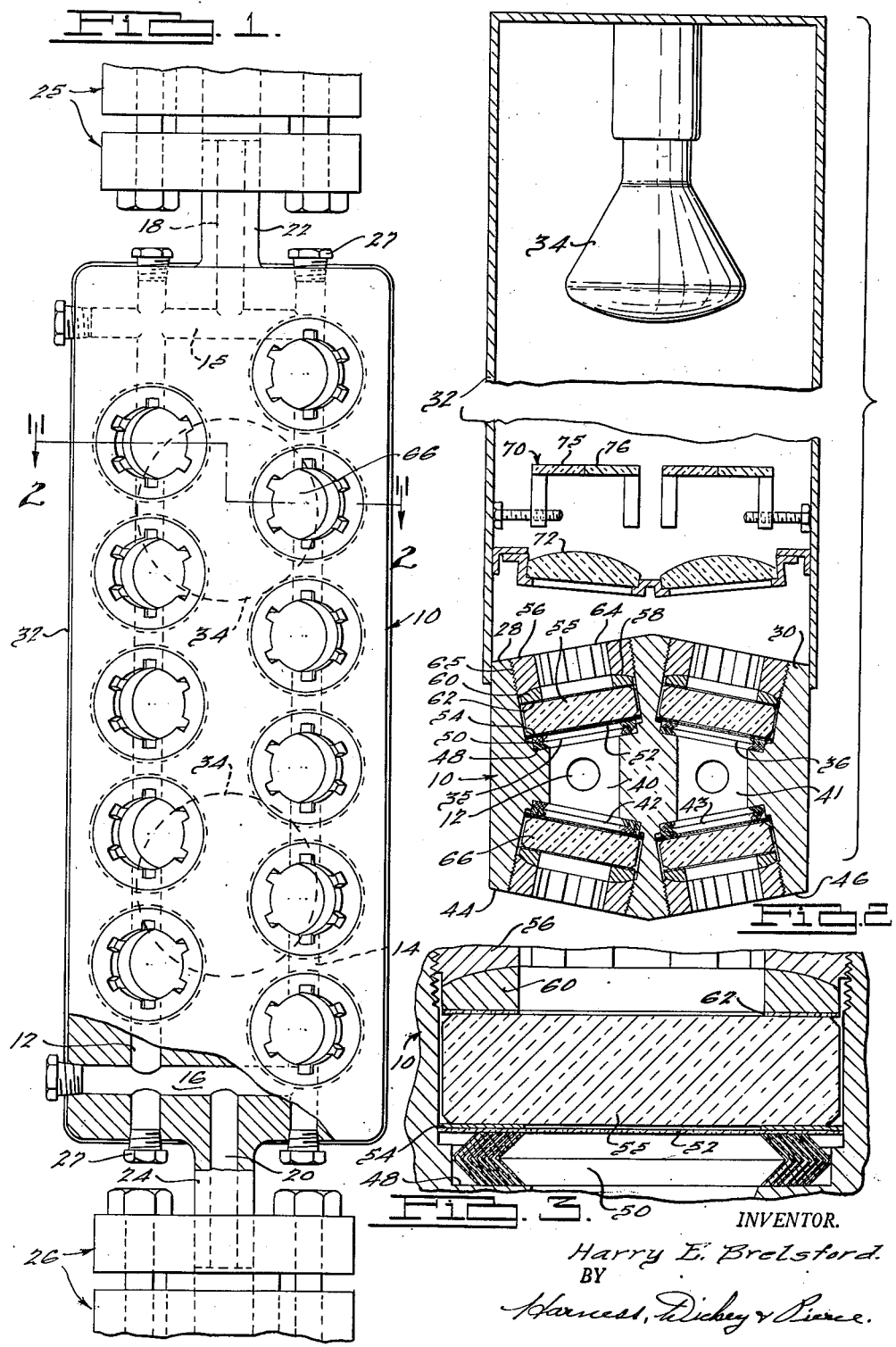
INVENTOR.
Harry E. Brelsford.
BY
Harness, Dickey & Pierce.
ATTORNEYS.

Patented July 15, 1952

2,603,090

UNITED STATES PATENT OFFICE 2,603,090

MULTIPORT WATER LEVEL INDICATOR

Harry E. Brelsford, Hale, Mich., assignor to Diamond Power Specialty Corporation, a corporation of Ohio Application August 27, 1948, Serial No. 46,434

3 Claims. (Cl. 73—331)

1

The present invention relates to the construction of liquid level indicators suitable for use to provide continuous indication of the water level in high pressure steam boilers and other apparatus which may operate at relatively high temperatures and pressures.

An important object of the invention is to provide an improved liquid level gauge capable of withstanding higher pressures in proportion to its size, weight, cost and complexity than previously known liquid level gauges.

The conventional water level indicating equipment for high temperature and high pressure conditions is made up of a holding frame with long rectangular glass windows, the faces of the glass windows being covered on the water side by thin mica sheets. By reason of the long length of the glass and the difference in the coefficient of expansion between the glass and the steel holding frames of such gauges, severe stresses are set up in the glass. Furthermore, the long windows of such prior art gauges prevented cross bracing of parts of the gauge structure on opposite sides of the windows, and by reason of this fact massive, expensive and cumbersome construction of such gauges was necessary in order to overcome the tendency of the internal pressure to bulge the frame structure and crack the glass.

The present invention is designed to use small round glasses which will bring about greatly reduced strain in the glass itself, thereby reducing the frequent breakage which takes place in the long longitudinal glasses of the conventional water level indicating equipment.

The glasses contemplated in this invention, by reason of their size and shape, will be considerably less expensive than the conventional glass, and the mica will be of smaller size, more easily obtainable and less expensive.

Another important object of the invention is to provide such an improved liquid level gauge construction adapted to operate in conjunction with bi-color optical means following the principle disclosed in Blackburn Patent No. 2,024,815, but which eliminates the need for elongated viewing windows and yet provides in effect a continuous uninterrupted indication of liquid level for the full gauge height. A related object is to provide such an improved gauge which may be extended to great length, yet which employs transparent windows of relatively small size, so arranged that the entire structure is capable of withstanding higher pressures in proportion to the dimensions and weight thereof than gauges incorporating the commonly employed elongated window constructions.

2

Still another important object of the present invention is to provide an improved liquid level gauge of the type having a plurality of circular sight windows through which liquid level may be directly observed, and to incorporate therein improved means for sealing the transparent windows with respect to the supporting housing in which they are arranged, improved means for equalizing stresses applied to different parts of the windows, and improved means for preventing the development of unduly high stresses, while nevertheless permitting quick and simple removal and replacement of windows when desired.

Other objects and advantages will be apparent upon consideration of the present disclosure in its entirety.

In the drawings:

Figure 1 is a front elevational view, with parts broken away and in section, of a multi-port liquid level gauge constructed in accordance with the present invention;

Fig. 2 is a horizontal sectional view thereof taken substantially on the line 2—2 of Fig. 1 and looking in the direction of the arrows; and Fig. 3 is an enlarged detailed section of one of the ports.

Referring now to the drawing, my improved gauge assembly comprises a body portion generally designated 10 which is adapted to be mounted in vertical position and which will be referred to as if so arranged. The body is preferably formed of steel or other metal and contains two vertical, laterally spaced water passages 12, 14 connected together near the top, and also near the lower end of the body, as by the cross passages 15, 16. The passages are adapted to be connected at their upper and lower extremities to the steam and water-containing portions of a boiler, as by means of central longitudinally extending end-connecting passages 18, 20 communicating with passages 15, 16, respectively, and carried outwardly through terminal connecting stem portions 22, 24, flanged at their ends and adapted to be connected as by means of cooperating coupling portions 25, 26 to a water column or directly to the steam and water-containing portions of a boiler, or analogous parts of other liquid-containing apparatus within which it is desired to observe the liquid level. The passages 12, 14, 15, 16 may be formed by drilling the body, and the outer ends of the drilled passages may be closed by means of plugs as 27.

It will be understood that in use the entire assembly is positioned at a height such that the normal or intended liquid level within the body lies intermediate the upper and lower extremities

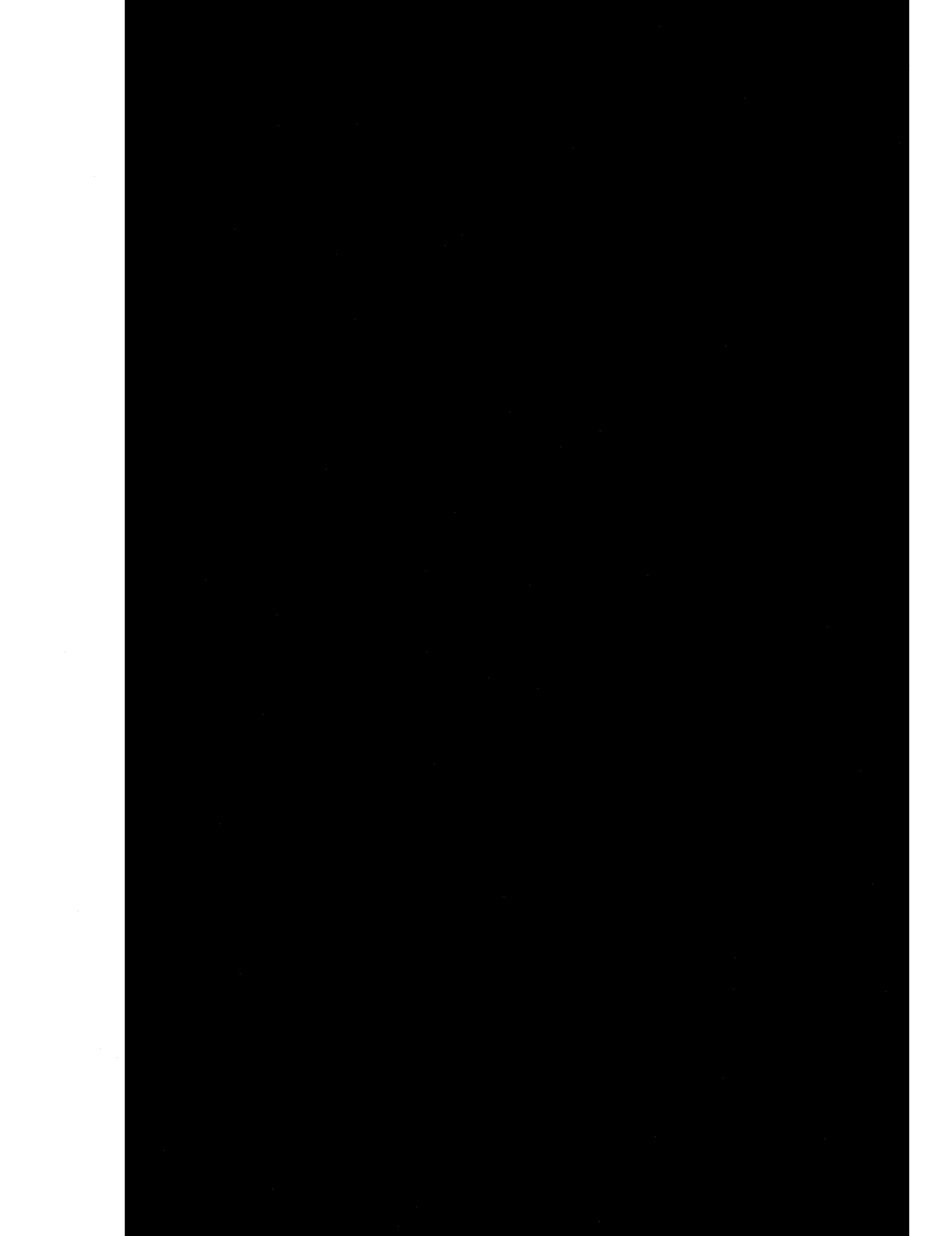

and elements in engagement therewith may assume any slight tilt which may be required on account of uneven compression of the composite gasket 50, or due to any differences in thickness of the mica or other elements, or due to any lack of parallelism between the glass surfaces, while the washer nevertheless maintains full engagement with the glass surface and no binding or uneven stressing of the glass will result. It will be appreciated that this arrangement will also compensate for any differences in the rate of expansion between opposite sides of the glass and other elements housed in the port. Due to the spherical contour of the surfaces in question and the yieldable character of the gasketing elements, limited universal rocking movement between the washer 60 and ring 56 can occur where the rates of expansion are different upon opposite sides of the port due to differences in temperature, and uneven stressing of the glass is thereby minimized reducing the danger of fracturing the glass due to uneven heating, which has heretofore been a frequent cause of glass failure.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. A liquid level gauge comprising a body adapted to define a water chamber and having a plurality of vertically spaced substantially circular observation ports extending through said body from the exterior thereof to said chamber, a flat observation window in each of said ports, and means for retaining each window in and sealing it with respect to each such port including a seating element having a generally spherical outer face and having a flat inner face adapted to react against and substantially conforming to the outer surface of the window, and a clamping ring adapted to bear against said seating element and having an inner surface bearing against and substantially conforming to said spherical face of the seating element.

2. Means as set forth in claim 1 including a relatively resilient gasket between the window and body, a transparent and relatively flexible disk interposed between the gasket and window, and a relatively thin harder protective annulus between the disk and window.

3. Means as set forth in claim 1, wherein the seating element and clamping ring are also arranged within the port and the seating element and glass are of lesser diameter than and rockable with relation to the port while remaining in slidable engagement with the clamping ring.

HARRY E. BRELSFORD.

REFERENCES CITED

The following references are of record in the file of this patent:

UNITED STATES PATENTS

| Number | Name | Date |
|---|---|---|
| 1,136,468 | Hanlon | Apr. 20, 1915 |
| 1,703,426 | Kerr | Feb. 26, 1929 |
| 2,024,815 | Blackburn | Feb. 17, 1935 |
| 2,320,563 | Brelsford | June 1, 1943 |

FOREIGN PATENTS

| Number | Country | Date |
|---|---|---|
| 566,220 | France | Feb. 11, 1934 |